United States Patent
Kim et al.

(10) Patent No.: US 11,563,225 B2
(45) Date of Patent: Jan. 24, 2023

(54) SYSTEM AND METHOD OF CONTROLLING AIR COMPRESSOR MOTOR FOR FUEL CELL VEHICLE AND SYSTEM AND METHOD OF CONTROLLING OPERATION OF FUEL CELL VEHICLE USING SAME

(71) Applicants: Hyundai Motor Company, Seoul (KR); Kia Motors Corporation, Seoul (KR)

(72) Inventors: Sung Do Kim, Seoul (KR); Min Su Kang, Gyeonggi-do (KR); Chang Seok You, Gyeonggi-do (KR); Dong Hun Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 936 days.

(21) Appl. No.: 16/385,927

(22) Filed: Apr. 16, 2019

(65) Prior Publication Data
US 2020/0144643 A1 May 7, 2020

(30) Foreign Application Priority Data
Nov. 1, 2018 (KR) .................. 10-2018-0132799

(51) Int. Cl.
*B60L 11/18* (2006.01)
*B60K 1/00* (2006.01)
(Continued)

(52) U.S. Cl.
CPC ........... *H01M 8/0494* (2013.01); *B60L 50/70* (2019.02); *B60L 50/75* (2019.02); *B60L 58/30* (2019.02);
(Continued)

(58) Field of Classification Search
CPC ......... H01M 8/04776; H01M 8/04567; H01M 8/04597; H01M 8/04111; H01M 8/04425; H01M 8/0494; H01M 8/04686
See application file for complete search history.

(56) References Cited

U.S. PATENT DOCUMENTS

2002/0157881 A1* 10/2002 Bakholdin ............... B60K 6/46 903/905
2002/0175010 A1* 11/2002 Kobayashi ............. B60L 58/33 180/65.31
(Continued)

FOREIGN PATENT DOCUMENTS

JP 2018-160430 A 10/2018
KR 20060070092 A 6/2006
(Continued)

OTHER PUBLICATIONS

Non-Final Office Action dated May 16, 2022 in U.S. Appl. No. 16/743,684.

*Primary Examiner* — Jared Fureman
*Assistant Examiner* — Esayas G Yeshaw
(74) *Attorney, Agent, or Firm* — Fox Rothschild LLP (57) ABSTRACT

A method of controlling an air compressor motor for a fuel cell vehicle is provide. The method includes calculating a counter electromotive force constant of the air compressor motor based on a voltage and a current of the air compressor motor for the fuel cell vehicle supplying air to a fuel cell stack and a rotation speed of the air compressor motor. The method additionally includes determining whether a permanent magnet of the air compressor motor is demagnetized based on a result of comparison between the calculated counter electromotive force constant value and a pre-set counter electromotive force constant design value.

10 Claims, 3 Drawing Sheets

(51) Int. Cl.
- *H01M 8/04858* (2016.01)
- *H01M 8/04537* (2016.01)
- *H01M 8/04111* (2016.01)
- *B60L 50/70* (2019.01)
- *B60L 58/40* (2019.01)
- *B60L 58/30* (2019.01)
- *H01M 8/04313* (2016.01)
- *B60L 50/75* (2019.01)
- *B60L 1/00* (2006.01)

(52) U.S. Cl.
CPC ......... *B60L 58/40* (2019.02); *H01M 8/04111* (2013.01); *H01M 8/04313* (2013.01); *H01M 8/04567* (2013.01); *H01M 8/04597* (2013.01); *B60L 1/003* (2013.01); *H01M 2250/20* (2013.01)

(56) References Cited

U.S. PATENT DOCUMENTS

| | | | |
|---|---|---|---|
| 2007/0036664 A1* | 2/2007 | Shibui | H02K 7/14 417/407 |
| 2019/0055890 A1* | 2/2019 | Ethier | H02K 11/0094 |
| 2019/0181467 A1* | 6/2019 | Farnsworth | H01M 8/04089 |
| 2019/0229357 A1* | 7/2019 | Ojima | H01M 10/44 |
| 2019/0267646 A1 | 8/2019 | Yamanaka et al. | |
| 2019/0288585 A1* | 9/2019 | Lee | H02P 21/08 |
| 2019/0291590 A1* | 9/2019 | Yeung | B60L 50/51 |
| 2020/0185736 A1* | 6/2020 | Ito | H01M 8/04955 |

FOREIGN PATENT DOCUMENTS

| KR | 20170122366 A | 11/2017 |
|---|---|---|
| KR | 2018-0126126 A | 11/2018 |

\* cited by examiner

SYSTEM AND METHOD OF CONTROLLING AIR COMPRESSOR MOTOR FOR FUEL CELL VEHICLE AND SYSTEM AND METHOD OF CONTROLLING OPERATION OF FUEL CELL VEHICLE USING SAME

CROSS REFERENCE TO RELATED APPLICATION

The present application claims priority to Korean Patent Application No. 10-2018-0132799, filed Nov. 1, 2018, the entire contents of which is incorporated herein for all purposes by this reference.

BACKGROUND

Field of the Invention

The present invention relates to a system and method of controlling an air compressor motor for a fuel cell vehicle and a system and method of controlling an operation of a fuel cell vehicle using the same and, more specifically, to a method of controlling an air compressor motor for a fuel cell vehicle and a method of controlling an operation of a fuel cell vehicle using the same capable of diagnosing an irreversible demagnetization of a permanent magnet in an air compressor motor for a fuel cell vehicle and stably operating an air compressor motor and the fuel cell vehicle based on the diagnosis result.

Description of the Related Art

An air compressor provided to supply air to a fuel cell stack in a fuel cell vehicle generates a high-pressure air flow by driving a motor. The permanent magnet, one of the main components of the air compressor motor, experiences an irreversible demagnetization, where magnetic flux is reduced, as time passes. Accordingly, a magnetic flux lower than the initial design value occurs due to the demagnetization of the permanent magnet, thereby causing the maximum driving speed of the air compressor motor to be reduced.

In particular, the air compressor motor for a fuel cell vehicle is a motor of a decreased size while having a capacity of a high speed and a high output, and has a substantial influence on an output when the demagnetization of the permanent magnet occurs. In addition, when the motor driving speed is reduced due to the occurrence of the demagnetization of the permanent magnet, air supply into the fuel cell stack becomes lower than the initial design value, thereby being insufficient. Accordingly, when a driver requests a high output during operation of a fuel cell vehicle, a voltage of the cell in the fuel cell stack is instantaneously decreased, and thus, the current limitation function for protecting the fuel cell stack is operated. Accordingly, a phenomenon in which a vehicle rattles and acceleration is limited may occur. Therefore, there is a need in the art for diagnosing the demagnetization of a permanent magnet of an air compressor motor and appropriately adjusting the operation of a motor and a fuel cell vehicle accordingly.

It should be understood that the foregoing description of the background art is merely for the purpose of promoting an understanding of the background of the present invention and is not to be construed as an admission that the related art is known to those skilled in the art.

SUMMARY

Accordingly, the present invention diagnoses or detects the demagnetization of a permanent magnet in an air compressor motor for a fuel cell vehicle, and adjusts an air compressor motor current based on the degree of the demagnetization, thereby allowing the air compressor motor to be driven to the maximum allowable speed which may be output in the demagnetized state.

The present invention thus provides a method of controlling a motor of an air compressor for a fuel cell vehicle and a method of controlling the operation of a fuel cell vehicle using the same to solve a technical problem occurring in the related art, and the present invention is capable of improving the driving stability of a vehicle by limiting a stack current in advance by proactively applying a flow that may be supplied according to the maximum driving speed of the air compressor motor, wherein the maximum driving speed has been changed due to the demagnetization.

The present invention further provides a method of controlling an air compressor motor for a fuel cell vehicle that may include: calculating a counter electromotive force constant of the air compressor motor based on a voltage and a current of the air compressor motor for the fuel cell vehicle supplying air to a fuel cell stack and a rotation speed of the air compressor motor; and determining whether a permanent magnet of the air compressor motor is demagnetized based on a result of comparison between the calculated counter electromotive force constant and a pre-set counter electromotive force constant design value.

In an exemplary embodiment of the present invention, in the calculating of the counter electromotive force constant, a three-phase voltage and a three-phase current of the air compressor motor may be converted into voltages of d and q axes and currents of d and q axes, respectively, and the electromotive force constant of the air compressor motor may be calculated by applying the converted voltage of d and q axes, and an electric angular velocity of the air compressor motor to the motor equation. In the exemplary embodiment of the present invention, the electromotive force constant of the air compressor motor may be calculated using a following equation:

$$V_{dsyn} = R_s \times I_{dsyn} + L_d \times \frac{dI_{dsyn}}{dt} - L_q \times \omega_e \times I_{qsyn} \quad \text{Equation}$$

$$V_{qsyn} = R_s \times I_{qsyn} + L_q \times \frac{dI_{qsyn}}{dt} + L_q \times \omega_e \times I_{qsyn} + V_{emf}$$

where, since $V_{emf}=\lambda \times \omega_e$, then $\lambda=V_{emf}/\omega_e$.

In the above equation, $V_{dsyn}$ is the voltage of the d-axis of the air compressor motor, and $V_{qsyn}$ is the voltage of the q-axis of the air compressor motor, $I_{dsyn}$ is the current of the d-axis of the air compressor motor, $I_{qsyn}$ is the current of the q-axis of the air compressor motor, $R_s$ is a phase resistance of the air compressor motor, $L_d$ is a inductance value of the d-axis of the air compressor motor, $L_q$ is an inductance value of the q-axis of the air compressor motor, $\omega_e$ is the electric angular velocity of the air compressor motor, $V_{emf}$ is a counter electromotive force voltage of the air compressor motor, and $\lambda$ is the calculated counter electromotive force constant.

In the exemplary embodiment of the present invention, when the air compressor motor operates in a normal state, the calculating of the counter electromotive force constant may be performed. When demagnetization is detected in the permanent magnet of the air compressor motor, the exemplary embodiment of the present invention may further include calculating a maximum drivable speed that the air compressor motor can output in a demagnetized state using the calculated counter electromotive force constant calculated and the voltage and current of the air compressor motor. The exemplary embodiment of the present invention may further include compensating a beta angle map for adjusting a weak field magnet based on the maximum drivable speed of the air compressor motor in the calculated demagnetized state.

According to another exemplary embodiment, the present invention may further include: calculating a counter electromotive force constant of an air compressor motor based on a voltage and a current of the air compressor motor for the fuel cell vehicle supplying air to a fuel cell stack and a rotation speed of the air compressor motor; determining whether a permanent magnet of the air compressor motor is demagnetized based on a result of comparison between the calculated counter electromotive force constant and a pre-set counter electromotive force constant design value; calculating a maximum drivable speed that the air compressor motor can output in a demagnetized state using the calculated counter electromotive force constant ca and the voltage and current of the air compressor motor; calculating an air supply limit that is an amount of air suppliable to the fuel cell stack by the maximum drivable speed that the air compressor motor can output in the demagnetized state; and limiting an output of the fuel cell stack to a level equal to or less than an output of the fuel cell stack corresponding to the air supply limit.

The exemplary embodiment of the present invention may further include confirming a state of charge of the energy storage device that provides power to a driving motor of the fuel cell vehicle after limiting the output of the fuel cell stack; and limiting an oscillation performance of the fuel cell vehicle by limiting a current supplied to the driving motor of the fuel cell vehicle when the state of charge of the energy storage device is insufficient.

According to a method of operating an air compressor motor for a fuel cell vehicle and a method of adjusting an operation of a fuel cell vehicle using the same, considering an amount of air supply reduced due to the demagnetization of the permanent magnet of the air compressor motor supplying compressed air into the fuel cell stack, a current of the fuel cell stack may be limited in advance, whereby problems such as vehicle rattling and the like may be resolved by preventing occurrence of operation of a current limitation function to prevent instantaneous decrease of the voltage in the fuel cell stack.

Particularly, according to a method of operating an air compressor motor for a fuel cell vehicle and a method of adjusting an operation of a fuel cell vehicle using the same, the vehicle oscillation performance may be limited in consideration of the state of charge of the energy storage device which provides power to the vehicle driving motor when the output of the fuel cell is limited due to the demagnetization of the air compressor motor.

Effects obtainable in the present invention are not limited to the effects mentioned above, and other effects not mentioned will be apparent to one of ordinary skill in the art from the following description.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method of controlling an air compressor motor for a fuel cell vehicle according to various exemplary embodiments of the present invention will be described in detail with reference to the accompanying drawings.

Figure 1:
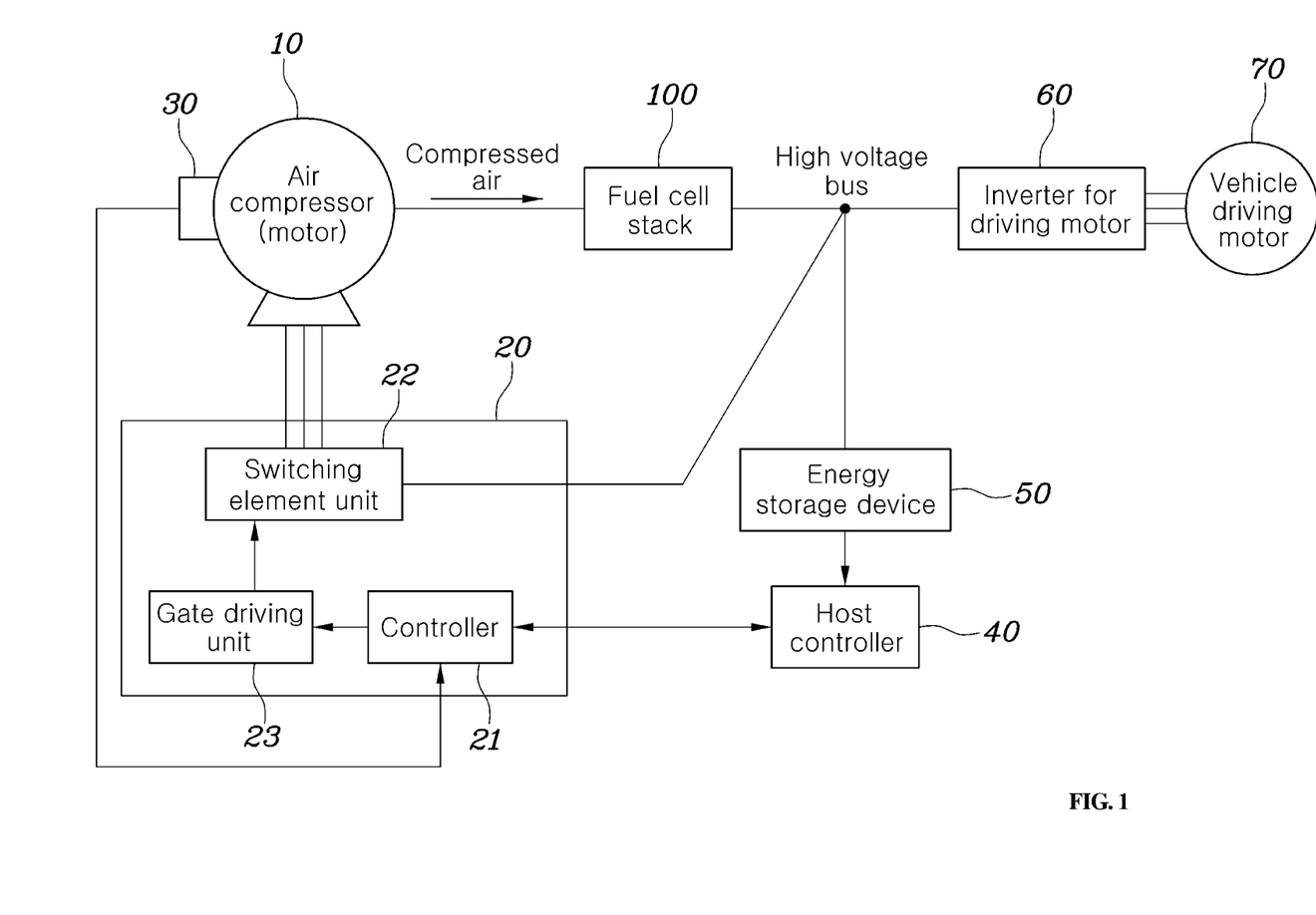
FIG. 1 is a block diagram illustrating schematically a fuel cell vehicle system to which a method of controlling an air compressor motor for a fuel cell vehicle and a method of controlling an operation of a fuel cell vehicle using the same according to various exemplary embodiments of the present invention are applied.

FIG. 1 is a block diagram illustrating schematically a fuel cell vehicle system to which a method of controlling an air compressor motor for a fuel cell vehicle and a method of controlling an operation of a fuel cell vehicle using the same according to various exemplary embodiments of the present invention are applied. As illustrated in FIG. 1, a fuel cell vehicle system may include: a fuel cell stack 100 including a fuel cell configured to receive hydrogen and air as a fuel and an oxidant, respectively, thereby generating electric power through an oxidation-reduction reaction; and an air compressor 10 configured to supply compressed air to a cathode.

Additionally, a humidifier may be disposed between the fuel cell stack 100 and the air compressor 10 to supply moisture to the compressed air output from the air compressor 10 and to allow the moist air to be transferred to the fuel cell stack 100. However, it is not related to the main technical idea of the present invention, thereby being omitted from the drawings. The air compressor 10 may include an electric motor and may be configured to generate compressed air by driving the electric motor. In the present specification, the air compressor 10 and a motor in the air compressor 10 are considered to be the same, and thus will be described using the same reference numeral. In other words, it should be understood that controlling the air compressor 10 means controlling the air compressor motor 10.

To operate or control the air compressor motor 10, the fuel cell vehicle system may include an inverter 20. The inverter 20 may be configured to operate the motor to allow the air compressor motor 10 to correspond to a speed command. More specifically, the inverter 20 may include: a controller 21 configured to calculate a pulse width modulation (PWM) signal for adjusting the speed of the air compressor motor 10 to correspond to the speed command based on the speed command provided from a host controller 40, a current and a voltage of the air compressor motor 10 fed back from the air compressor motor 10, and information regarding the rotor position provided by a position sensor 30 (e.g., a hall sensor, etc.) configured to detect the position of a rotor of the air compressor motor 10; and a switching element unit 22 including a plurality of switching elements configured to output a three-phase motor voltage with on/off thereof being determined by the PWM signal generated from the controller 21.

The speed control of the motor performed in the controller 21 may be performed by various related control techniques known in the art. In addition, the switching element unit 22 may include a plurality of power semiconductor switching elements (e.g., Insulated Gate Bipolar Transistor (IGBT), etc.) configured to convert an input direct current (DC) voltage into a three phase alternating current (AC) voltage based on the PWM signal, thereby providing the three phase AC voltage to the air compressor motor 10. The circuit structure of the switching element unit 22 may also apply a well-known technique in the related art.

In addition, the controller 21 may be configured to detect whether the permanent magnet is demagnetized using the rotation speed of the rotor derived based on the voltage and current provided to the air compressor motor 10 and the information on the rotor position provided by the position sensor 30. Accordingly, the controller 21 may be configured to perform motor control in consideration of the occurrence of the demagnetization, when the demagnetization has occurred.

Meanwhile, the inverter 20 may further include a gate driving unit 23 configured to provide a control signal for turning on/off to a gate of the switching element inside the switching element unit 22 for driving the switching element unit 22 based on the PWM signal generated from the controller 21. The DC voltage generated and output from the fuel cell stack 100 may be output to a high voltage bus terminal. The high voltage bus terminal may be connected to an energy storage device 50 and an input terminal of the inverter 60, for a driving motor, which provides a three-phase AC voltage to a vehicle driving motor 70 that generates a driving force of a vehicle.

The energy storage device 50 may be configured to store electric energy like a battery and may be charged by receiving power from the high-voltage bus terminal or may be configured to output the power for driving the vehicle driving motor 70 to the high-voltage bus terminal, as necessary. A DC-DC converter (not shown) configured to convert a voltage magnitude may be disposed between the energy storage device 50 and the high voltage bus terminal.

The host controller 40 may be configured to generate a speed command of the air compressor motor 10 based on an input by a driver and provide the speed command to the controller 21. When the controller 21 determines the demagnetization of the air compressor motor 10 has occurred, the host controller 40 may be configured to perform various controls for vehicle operation. For example, when a demagnetization of the air compressor motor 10 has occurred, the host controller 40 may be configured to adjust a driving state of the vehicle such as an air supply limit, a fuel cell stack output limit, output limit of the vehicle driving motor 70 based on the state of charge of the energy storage device 50, and the like. By the system configured as above, a method of controlling an air compressor motor for a fuel cell vehicle and a method of controlling an operation of a fuel cell vehicle using the same according to various exemplary embodiments of the present invention may be realized.

Figure 2:
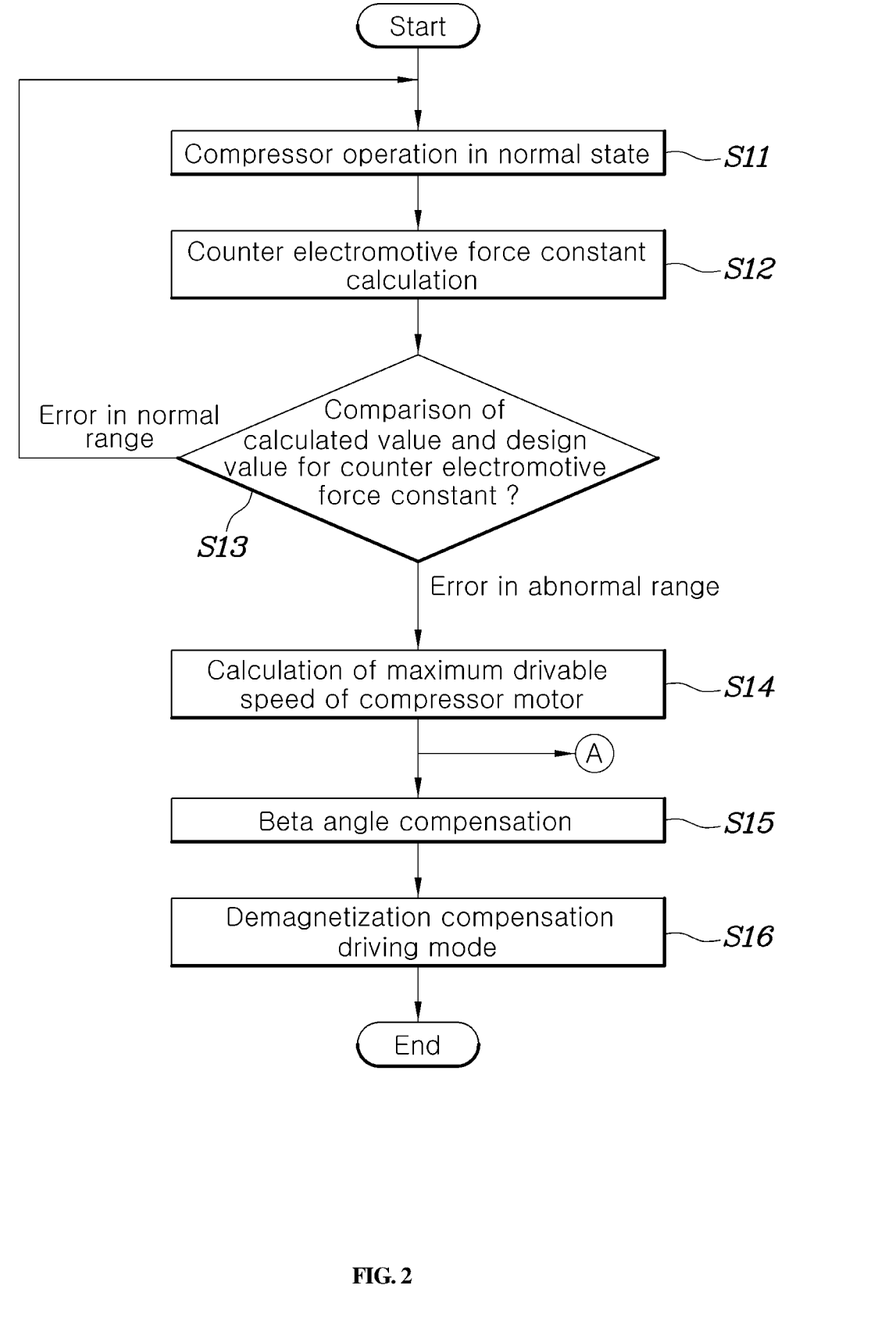
FIG. 2 is a flowchart illustrating a method of controlling an air compressor motor for a fuel cell vehicle according to an exemplary embodiment of the present invention.

FIG. 2 is a flowchart illustrating a method of controlling an air compressor motor for a fuel cell vehicle according to an exemplary embodiment of the present invention. The method described herein below may be executed by a controller having a processor and a memory. With reference to FIG. 2, a method of controlling an air compressor motor for a fuel cell vehicle according to an exemplary embodiment of the present invention may include: calculating a counter electromotive force constant of the air compressor motor in S12; and determining whether the permanent magnet of the air compressor motor is demagnetized based on a result of comparison between the calculated counter electromotive force constant and a pre-set counter electromotive force constant design value.

The counter electromotive force constant of the air compressor motor 10 may be calculated using a motor equation based on the rotation speed of the air compressor motor 10 derived by the controller 21 in the inverter 20 using the voltage and current of the air compressor motor 10 and the position information of the position sensor 30 configured to detect the position sensor of the rotor of the motor 10. Even though not shown in FIG. 1, in three-phase connection lines connected to the air compressor motor 10 from the switching element unit 22 of the inverter 20, a voltage sensor and a current sensor for each phase may be provided. Accordingly, the three-phase voltage and the three-phase current of the air compressor motor 10 may be sensed by the voltage sensors and the current sensors, and the sensed value may be provided to the controller 21.

In addition, the air compressor motor 10 may include a motor rotor position sensor such as a resolver, an encoder, or a hall sensor, and the controller 21 may be configured to derive the rotation speed of the air compressor motor 10 by receiving the position sensing value output from the motor rotor position sensor 30. The details of sensing the voltage and current of the motor and deriving the rotation speed of the motor are well known to those of ordinary skill in the art, and thus a detailed description thereof will be omitted. In step S12, the controller 21 may be configured to calculate the counter electromotive force constant of the air compressor motor 10 by applying the voltage and the current of the air compressor motor 10 and the rotation speed of the air compressor motor 10 to a motor equation as in the following equation 1.

$$V_{dsyn} = R_s \times I_{dsyn} + L_d \times \frac{dI_{dsyn}}{dt} - L_q \times \omega_e \times I_{qsyn} \quad \text{Equation 1}$$

$$V_{qsyn} = R_s \times I_{qsyn} + L_q \times \frac{dI_{qsyn}}{dt} + L_q \times \omega_e \times I_{qsyn} + V_{emf}$$

where, since $V_{emf} = \lambda \times \omega_e$, then $\lambda = V_{emf}/\omega_e$."

In equation 1, $V_{dsyn}$ is a d-axis voltage of the air compressor motor 10, $V_{qsyn}$ is the q-axis voltage of the air compressor motor 10, $I_{dsyn}$ is the d-axis current of the air compressor motor 10, $I_{qsyn}$ is the q-axis current of the air compressor motor 10, $R_s$ is a phase resistance, $L_d$ is a d-axis inductance value of the air compressor motor 10, $L_q$ is a q-axis inductance value of the air compressor motor 10, $\omega_e$ is an electrical angular velocity of the air compressor motor 10, $V_{emf}$ is a counter electromotive force voltage of the air compressor motor 10, and is a counter electromotive force constant.

Equation 1 is a motor equation using values obtained by coordinate transformation of the three-phase voltage and current of a motor into d and q axes, respectively, and the voltage and current sensing values of the air compressor motor 10 received from the sensors, respectively, may be transformed into d and q axes by the controller 21 and applied to equation 1. In equation 1, a phase resistance $R_s$ and inductance values $L_d$ and $L_q$ of the d and q axes, respectively, may be determined in advance at the time of manufacturing of the system, and the electric angular velocity $\omega_e$ may be calculated based on the motor rotor position change detected by the motor rotor position sensor 30 and the pole of the motor.

Subsequently, in step S13, whether the permanent magnet in the air compressor motor 10 inside the air compressor motor has occurred may be determined by comparing the counter electromotive force constant calculated as in equation 1 in step S12 and the counter electromotive force constant design value pre-set at the time of designing of the system each other. For example, the controller 21 may be configured to subtract the counter electromotive force constant calculation value calculated in step S12 from the pre-set counter electromotive force constant design value. Accordingly, when the magnitude of the difference is greater than a pre-set value, the controller 21 may be configured to determine that an error of the two values is in an abnormal range and thus detect that the demagnetization has occurred.

In another example, the controller 21 may be configured to divide the value obtained by subtracting the counter electromotive force constant calculation value calculated in step S12 from the pre-set counter electromotive force constant design value by the counter electromotive force constant, to thus calculate a ratio to an initial design value. Accordingly, when the calculated ratio is greater than a pre-set initial design value, the controller 21 may be configured to determine that an error is in an abnormal range and detect that the demagnetization has occurred.

Meanwhile, a method of controlling an air compressor motor for a fuel cell vehicle according to an exemplary embodiment of the present invention may be provided to more accurately measure a counter electromotive force constant, to be performed when the air compressor motor 10 is in a normal state to be stably operated at a constant speed by a pre-set constant speed drive command. In other words, when the controller 21 may be configured to determine that the air compressor motor 10 is operated in a normal state since a rotation speed command input from the host controller 40 is constant, and a rotation speed of the air compressor motor 10 derived by receiving the position sensing value output from the motor rotor position sensor 30 is constant. Accordingly, the controller 21 may be configured to perform step S12 calculating a counter electromotive force constant. Further, since, when the offset angle of the motor rotor position sensor 30 is distorted, the values in the d and q axes, respectively, are distorted and thus, the counter electromotive force constant calculation may be inaccurate, accordingly the controller 21 may be configured to confirm whether the offset angle of the motor rotor position sensor 30 is corrected in step S11. When the controller 21 determines the offset angle is corrected, the controller may perform step S12 of calculating the counter electromotive force constant.

A method of controlling an air compressor motor for a fuel cell vehicle according to an exemplary embodiment of the present invention may further include, after determining demagnetization has occurred in the permanent magnet of the air compressor motor 10, step S14 calculating a maximum drivable speed of the air compressor motor 10. When demagnetization is detected in the permanent magnet of the air compressor motor 10 in step S13, the controller 21 may be configured to calculate the maximum drivable speed that the air compressor motor 10 is capable of outputting in a demagnetized state using the calculated counter electromotive force constant and the maximum voltage and current capable of being provided to the air compressor motor 10.

The maximum drivable speed calculation in step S13 may also be performed using the motor equation such as equation 1, and, in particular, may also be performed as shown in the following equation 2 using the equation for the q-axis voltage and the q-axis current described in the second line of equation 1.

$$\omega_{q\_c} = \frac{V_{q\_c} - \left(R_a \times I_{q\_c} + L_q \times \frac{dI_{q\_c}}{dt}\right)}{L_q \times I_{q\_c} + \lambda} \quad \text{Equation 2}$$

In equation 2, $\omega_{e\_c}$ represents the maximum drivable speed capable of being output in a demagnetized state, $V_{q\_c}$ represents q-axis voltage of a motor provided when the air compressor motor is driven at a maximum speed and is a value determined in advance at the time of designing of the motor, $I_{q\_c}$ represents a q-axis current of a motor provided when the air compressor motor is driven at a maximum speed, and is a value determined in advance at the time of designing of the motor, and λ represents a counter electromotive force constant calculated by equation 1.

In addition, a method of controlling an air compressor motor for a fuel cell vehicle according to an exemplary embodiment of the present invention may further include step S15 of compensating beta angle map for adjusting a weak field magnet based on the maximum drivable speed of the air compressor motor 10 in the demagnetized state calculated in step S14. A weak field magnet control is, in a case where a counter electromotive voltage is formed high when a high speed control of a motor is performed, a control implemented to secure a voltage margin in a driving region where a three-phase voltage margin is insufficient.

When the motor is demagnetized, the torque of the motor is reduced even when the same current is applied to the motor as compared with the when the motor is not demagnetized. Therefore, the maximum value of the q-axis current which contributes to the torque is required to be compensated according to the maximum drivable speed to obtain a desired response. Step S15 of compensating the beta angle map may include adjusting the d-axis current to be reduced to further secure the q-axis current which contributes to the torque of the motor and the beta angle which is the angle between the motor stator current and the d-axis. Subsequently, the controller 21 may be configured to, in a demagnetized state, perform a driving mode compensating for the demagnetized state by operating the motor using the compensated beta angle map.

Figure 3:
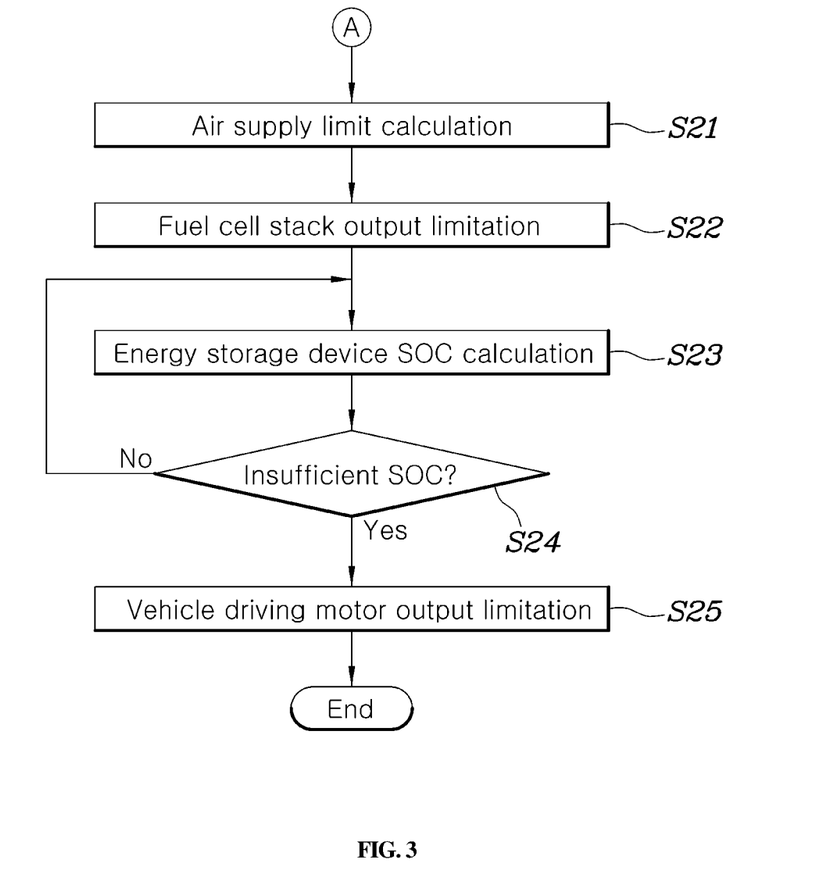
FIG. 3 is a flowchart illustrating a method of controlling an operation of a fuel cell vehicle using a method of controlling an air compressor motor for a fuel cell vehicle according to an exemplary embodiment of the present invention.

FIG. 3 is a flowchart illustrating a method of controlling an operation of a fuel cell vehicle using a method of controlling an air compressor motor for a fuel cell vehicle according to an exemplary embodiment of the present invention. The method described herein below may be executed by a controller having a processor and a memory. In particular, the controller 21 may be configured to calculate the maximum drivable speed of the air compressor motor 10 in the demagnetized state in step S14, and then transmit the calculated result to the host controller 40.

The host controller 40 may be configured to provide the controller 21 with the speed command to operate the air compressor motor 10 based on the current output demand of the fuel cell stack 100. For example, when a maximum current output is required in the fuel cell stack 100, the host controller 40 may be configured to provide a speed command to the controller 21 to rotate the air compressor motor 10 at a maximum speed.

When a maximum current output is required and the host controller 40 does not detect a demagnetized state of the air compressor motor 10, a speed command for rotating the air compressor motor 10 at a maximum speed determined at the time of designing of the fuel cell system may be transmitted to the controller 21. However, since a rotation at the maximum speed determined at the design is impossible to be realized due to the demagnetization of the permanent magnet, the air compressor motor 10 is not able to supply the air required for the maximum current output of the fuel cell stack. Accordingly, the method of controlling an operation of a fuel cell vehicle using the method of controlling an air compressor motor for a fuel cell vehicle according to an exemplary embodiment of the present invention is provided to solve a problem of air supply shortage of the fuel cell stack 100 generated due to the demagnetization of the permanent magnet.

First, the host controller 40 may be configured to calculate an air supply limit in S21 based on the maximum drivable speed capable of being output in the demagnetized state of the air compressor motor, wherein information on the demagnetized state is provided from the controller 21. Particularly, it may be understood that the air supply limit is meant to be an amount of air that the air compressor motor 10, in the demagnetized state and being driven at a maximum speed, is capable of supplying to the fuel cell stack 100. The relationship between the rotation speed of the motor and the amount of the suppliable air in the design of the air compressor motor may be pre-set in advance at the time of designing of the system.

Subsequently, the host controller 40 may be configured to limit in S22 the output of the fuel cell stack 100 to no greater than the current output that can be output from the fuel cell stack 100 when the air supply limit calculated in step S21 is provided to the fuel cell stack 100. In other words, the host controller 40 may be configured to limit the output of the fuel cell stack 100 based on the amount of the air supply corresponding to the reduced maximum driving speed when the maximum driving speed is decreased due to the occurrence of the demagnetization of the permanent magnet in the air compressor motor 10 that supplies the compressed air to the fuel cell stack 100. Accordingly, problems caused by the air supply shortage to the fuel cell stack 100 may be solved.

Further, the host controller 40 may be configured to limit the oscillation performance of the vehicle based on the state of charge (SOC) of the energy storage device 50 (e.g., battery) when an output limit of the energy storage device 100 is generated. When an output limit of the energy storage device 100 is generated, the host controller 40 may be configured to calculate and confirm in S23 and S24 the state of charge of the energy storage device 50 that stores power to be provided to the driving motor of the vehicle. When the state of charge of the vehicle is determined to be insufficient, the host controller 40 may be configured to limit the oscillation performance of the vehicle in S25.

Meanwhile, the vehicle driving motor 70 may be driven using the output of the fuel cell stack 100 and the output of the energy storage device 50 in the fuel cell vehicle. When the output of the fuel cell stack 100 is limited, and the output of the energy storage device 50 is insufficient, the current that can be supplied to the vehicle driving motor 70 may be insufficient. Accordingly, it may be possible to limit the vehicle oscillation performance, thereby enabling the vehicle to be operated more stably. The oscillation performance limit S25 of the vehicle may be accomplished in such a manner that the host controller 40 operates the inverter 60 for the driving motor, thereby limiting the current supplied to the vehicle driving motor 70.

While the invention has been shown and described with respect to the exemplary embodiments thereof it will be apparent to those of ordinary skill in the art that various changes in form and details may be made therein without departing from the spirit of the invention

What is claimed is:
1. A method of controlling an air compressor motor for a fuel cell vehicle, comprising:
   calculating, by a controller, a counter electromotive force constant of the air compressor motor based on a voltage and a current of the air compressor motor for the fuel cell vehicle supplying air to a fuel cell stack and a rotation speed of the air compressor motor; and
   determining, by the controller, whether a permanent magnet of the air compressor motor is demagnetized based on a result of comparison between the calculated counter electromotive force constant and a pre-set counter electromotive force constant design value.

2. The method of claim 1, wherein, in the calculating of the counter electromotive force constant, a three-phase voltage and a three-phase current of the air compressor motor are converted into voltages of d and q axes and currents of d and q axes, respectively, and the electromotive force constant of the air compressor motor is calculated by applying the converted voltage of d and q axes, and an electric angular velocity of the air compressor motor to the motor equation.

3. The method of claim 2, wherein the electromotive force constant of the air compressor motor is calculated using a following equation:

$$V_{dsyn} = R_s \times I_{dsyn} + L_d \times \frac{dI_{dsyn}}{dt} - L_q \times \omega_e \times I_{qsyn}$$

$$V_{qsyn} = R_s \times I_{qsyn} + L_q \times \frac{dI_{qsyn}}{dt} + L_q \times \omega_e \times I_{qsyn} + V_{emf}$$

Equation where, since $V_{emf} = \lambda \times \omega_e$, then $\lambda = V_{emf}/\omega_e$ wherein, $V_{dsyn}$ is the voltage of the d-axis of the air compressor motor, and $V_{dsyn}$ is the voltage of the q-axis of the air compressor motor, $I_{dsyn}$ is the current of the d-axis of the air compressor motor, $I_{qsyn}$ is the current of the q-axis of the air compressor motor, $R_s$ is a phase resistance of the air compressor motor, $L_d$ is a inductance value of the d-axis of the air compressor motor, $L_q$ is an inductance value of the q-axis of the air compressor motor, $\omega_e$ is the electric angular velocity of the air compressor motor, $V_{emf}$ is a counter electromotive force voltage of the air compressor motor, and is the calculated counter electromotive force constant.

4. The method of claim 1, wherein when the air compressor motor operates in a normal state, the counter electromotive force constant is calculated.

5. The method of claim 1, wherein when demagnetization is detected in the permanent magnet of the air compressor motor, the method further includes:
calculating, by the controller, a maximum drivable speed that the air compressor motor is capable of outputting in a demagnetized state using the calculated counter electromotive force constant and the voltage and current of the air compressor motor.

6. The method of claim 5, further comprising:
compensating, by the controller, a beta angle map for adjusting a weak field magnet based on the maximum drivable speed of the air compressor motor in the calculated demagnetized state.

7. A method of controlling an operation of a fuel cell vehicle; comprising:
calculating, by a controller, a counter electromotive force constant of an air compressor motor based on a voltage and a current of the air compressor motor for the fuel cell vehicle supplying air to a fuel cell stack and a rotation speed of the air compressor motor;
determining, by the controller, whether a permanent magnet of the air compressor motor is demagnetized based on a result of comparison between the calculated counter electromotive force constant and a pre-set counter electromotive force constant design value;
calculating, by the controller, a maximum drivable speed that the air compressor motor is capable of outputting in a demagnetized state using the calculated counter electromotive force constant and the voltage and current of the air compressor motor;
calculating, by the controller, an air supply limit that is an amount of air capable of being supplied to the fuel cell stack by the maximum drivable speed that the air compressor motor is capable of outputting in the demagnetized state; and
limiting, by the controller, an output of the fuel cell stack to a level equal to or less than an output of the fuel cell stack corresponding to the air supply limit.

8. The method of claim 7, further comprising:
confirming, by the controller, a state of charge of the energy storage device that provides power to a driving motor of the fuel cell vehicle after limiting the output of the fuel cell stack; and
limiting, by the controller, an oscillation performance of the fuel cell vehicle by limiting a current supplied to the driving motor of the fuel cell vehicle when the state of charge of the energy storage device is insufficient.

9. A system of controlling an operation of a fuel cell vehicle, comprising:
a memory configured to store program instructions; and
a processor configured to execute the program instructions, the program instructions when executed configured to:
calculate a counter electromotive force constant of an air compressor motor based on a voltage and a current of the air compressor motor for the fuel cell vehicle supplying air to a fuel cell stack and a rotation speed of the air compressor motor;
determine whether a permanent magnet of the air compressor motor is demagnetized based on a result of comparison between the calculated counter electromotive force constant and a pre-set counter electromotive force constant design value;
calculate a maximum drivable speed that the air compressor motor is capable of outputting in a demagnetized state using the calculated counter electromotive force constant and the voltage and current of the air compressor motor;
calculate an air supply limit that is an amount of air capable of being supplied to the fuel cell stack by the maximum drivable speed that the air compressor motor is capable of outputting in the demagnetized state; and
limit an output of the fuel cell stack to a level equal to or less than an output of the fuel cell stack corresponding to the air supply limit.

10. The system of claim 9, wherein the program instructions when executed are further configured to:
confirm a state of charge of the energy storage device that provides power to a driving motor of the fuel cell vehicle after limiting the output of the fuel cell stack; and
limit an oscillation performance of the fuel cell vehicle by limiting a current supplied to the driving motor of the fuel cell vehicle when the state of charge of the energy storage device is insufficient.

* * * * *